US010526013B2

(12) United States Patent
Mizutani et al.

(10) Patent No.: US 10,526,013 B2
(45) Date of Patent: Jan. 7, 2020

(54) PARKING ASSIST APPARATUS

(71) Applicant: AISIN SEIKI KABUSHIKI KAISHA, Kariya-shi, Aichi-ken (JP)

(72) Inventors: Yuichi Mizutani, Chita-gun (JP); Tetsuya Ohira, Anjo (JP)

(73) Assignee: AISIN SEIKI KABUSHIKI KAISHA, Kariya-shi, Aichi-ken (JP)

(*) Notice: Subject to any disclaimer, the term of this patent is extended or adjusted under 35 U.S.C. 154(b) by 196 days.

(21) Appl. No.: 15/704,060

(22) Filed: Sep. 14, 2017

(65) Prior Publication Data
US 2018/0208245 A1   Jul. 26, 2018

(30) Foreign Application Priority Data

Jan. 23, 2017   (JP) .................. 2017-009618

(51) Int. Cl.
*B60W 30/06* (2006.01)
*B62D 15/02* (2006.01)
(Continued)

(52) U.S. Cl.
CPC ......... *B62D 15/0285* (2013.01); *B60W 30/06* (2013.01); *B60W 50/14* (2013.01);
(Continued)

(58) Field of Classification Search
CPC ... B62D 15/0285; B60W 30/06; B60W 50/14; B60W 2710/10; B60W 2720/10;
(Continued)

(56) References Cited

U.S. PATENT DOCUMENTS 7,340,335 B2    3/2008  Kitaori et al.
2005/0027415 A1*  2/2005  Iwazaki ............ B62D 15/0285
                                              701/36
(Continued)

FOREIGN PATENT DOCUMENTS

EP    2 957 474 A1   12/2015
EP    2 965 965 A1    1/2016
(Continued)

OTHER PUBLICATIONS

Extended European Search Report dated Apr. 26, 2018 issued by the European Patent Office in counterpart application No. 17190789.2.

*Primary Examiner* — Stephen Holwerda
(74) *Attorney, Agent, or Firm* — Sughrue Mion, PLLC

(57) ABSTRACT

A parking assist apparatus includes: a distance obtaining portion that obtains a movement distance from a current position of a vehicle to a parking target position; a vehicle speed calculating portion that calculates a target vehicle speed with a lapse of time until the vehicle reaches the parking target position, based on the movement distance, and a vehicle speed and acceleration and deceleration which are set in advance; a position calculating portion that calculates a movement target position of the vehicle in accordance with the time until the vehicle reaches the parking target position, based on the target vehicle speed with the lapse of time; and a controller that controls a vehicle running state such that the vehicle is moved to the movement target position at the target vehicle speed.

8 Claims, 9 Drawing Sheets

(51) Int. Cl.
*B60W 50/14* (2012.01)
*G06F 3/16* (2006.01)
*G06K 9/00* (2006.01)

(52) U.S. Cl.
CPC ......... *G06F 3/167* (2013.01); *G06K 9/00805* (2013.01); *G06K 9/00812* (2013.01); *B60W 2710/10* (2013.01); *B60W 2710/18* (2013.01); *B60W 2710/20* (2013.01); *B60W 2720/10* (2013.01)

(58) Field of Classification Search
CPC ........... B60W 2710/20; B60W 2710/18; G06F 3/167; G06K 9/00805; G06K 9/00812
See application file for complete search history.

(56) References Cited

U.S. PATENT DOCUMENTS

2015/0307089 A1* 10/2015 Vorobieva ............ B62D 15/027
 701/25
2015/0367845 A1 12/2015 Sannodo et al.
2015/0375740 A1* 12/2015 Okamura .............. B60W 30/06
 701/25
2016/0272244 A1 9/2016 Imai et al.

FOREIGN PATENT DOCUMENTS

| EP | 3 061 655 A1 | 8/2016 |
| JP | 2006-083884 A | 3/2006 |
| JP | 2016-094112 A | 5/2016 |

\* cited by examiner

PARKING ASSIST APPARATUS

CROSS REFERENCE TO RELATED APPLICATIONS

This application is based on and claims priority under 35 U.S.C. § 119 to Japanese Patent Application 2017-009618, filed on Jan. 23, 2017, the entire contents of which are incorporated herein by reference.

TECHNICAL FIELD

This disclosure relates to a parking assist apparatus.

BACKGROUND DISCUSSION

In the related art, a parking assist apparatus (running assist apparatus) in which a load of a parking operation is reduced for a driver, by searching for a parking space where a host vehicle is capable of being parked, calculating a vehicle track which is most suitable up to a parking target position set in the parking space, and guiding the host vehicle in accordance with the vehicle track, with various sensors which are mounted on the vehicle, has been proposed.

JP 2016-94112A (Reference 1) is an example of the related art.

However, the parking (running) assist apparatus of the related art sequentially controls driving force and braking force of the vehicle to be capable of following the calculated movement path. Therefore, there is a case where switching between an acceleration state and a deceleration state is likely to be generated during the parking (running) assist, or ride comfortability of a passenger in the vehicle is lowered. There is a meaning if it is possible to provide a parking assist apparatus that can more smoothly realize the movement up to the parking target position.

SUMMARY

A parking assist apparatus according to an aspect of this disclosure includes a distance obtaining portion that obtains a movement distance from a current position of a vehicle to a parking target position, a vehicle speed calculating portion that calculates a target vehicle speed with a lapse of time until the vehicle reaches the parking target position, based on the movement distance, and a vehicle speed and acceleration and deceleration which are set in advance, a position calculating portion that calculates a movement target position of the vehicle in accordance with the time until the vehicle reaches the parking target position, based on the target vehicle speed with the lapse of time, and a controller that controls a vehicle running state such that the vehicle is moved to the movement target position at the target vehicle speed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, exemplary embodiments disclosed here are disclosed. A configuration of the embodiment illustrated hereinafter, and an action, a result, and an effect by the configuration are merely an example. The embodiments disclosed here may be realized by other configurations in addition to the configuration disclosed in the embodiment hereinafter, and may obtain at least one of various effects based on a basic configuration and derivative effects.

In the embodiment, for example, a vehicle 1 on which a parking assist apparatus is mounted may be an automobile using an internal combustion engine not illustrated as a drive source, that is, an internal combustion engine automobile, may be an automobile using an electric motor not illustrated as a drive source, that is, an electric automobile or a fuel cell automobile, may be a hybrid automobile using both thereof as a drive source, or may be an automobile including other drive sources. On the vehicle 1, it is possible to mount various speed change gears, and it is possible to mount various apparatuses which are necessary to drive the internal combustion engine or the electric motor, for example, a system or a component. It is possible to variously set a method, the number, a layout of an apparatus relating to the driving of a wheel 3 in the vehicle 1.

Figure 1:
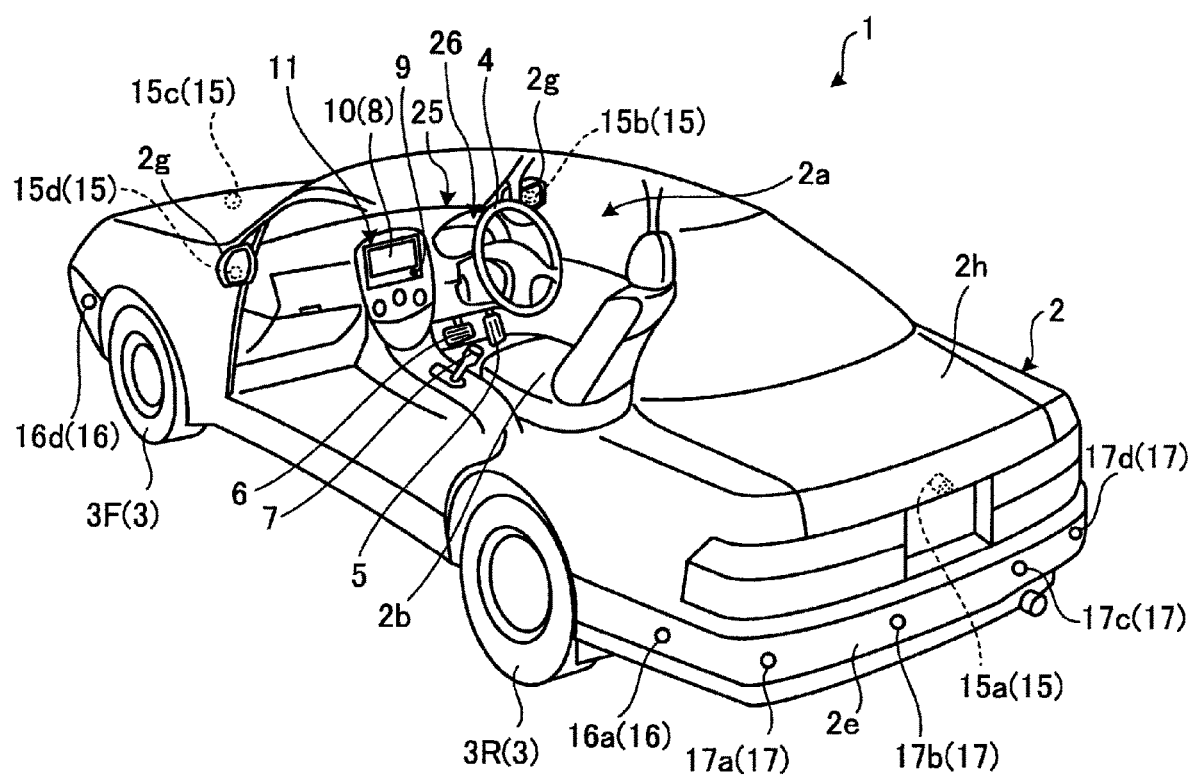
FIG. 1 is an exemplary perspective view illustrating a state where a portion of a passenger compartment of a vehicle on which a parking assist apparatus according to an embodiment is mounted is perspectively viewed.

As illustrated in FIG. 1, a vehicle body 2 configures a passenger compartment 2a in which a passenger not illustrated rides the vehicle 1. Within the passenger compartment 2a, a steering portion 4, an acceleration operation portion 5, a braking operation portion 6, a speed change operation portion 7, and the like are provided, in a state of being viewed in a seat 2b of a driver as a passenger. For example, the steering portion 4 is a steering wheel protruding from a dashboard 25. For example, the acceleration operation portion 5 is an accelerator pedal which is positioned under a foot of the driver. For example, the braking operation portion 6 is a brake pedal which is positioned under the foot of the driver. For example, the speed change operation portion 7 is a shift lever protruding from a center console. The steering portion 4, the acceleration operation portion 5, the braking operation portion 6, the speed change operation portion 7, and the like are not limited thereto.

Within the passenger compartment 2a, a display apparatus 8 as a display output portion, and a voice output apparatus 9 as a voice output portion are disposed. For example, the display apparatus 8 may be a liquid crystal display (LCD), an organic electroluminescent display (OELD), or the like. For example, the voice output apparatus 9 may be a speaker. For example, the display apparatus 8 is covered with a transparent operation input portion 10 such as a touch panel. The passenger can visually recognize an image which is displayed on a display screen of the display apparatus 8 through the operation input portion 10. Moreover, the passenger can execute an operation input by operating of touching, pushing, or moving the operation input portion 10 with a finger or the like at a position corresponding to the image which is displayed on the display screen of the display apparatus 8. For example, the display apparatus 8, the voice output apparatus 9, and the operation input portion 10 are disposed in a monitor apparatus 11 which is positioned in a central portion of a vehicle width direction of the dashboard 25, that is, a left and right direction. The monitor apparatus 11 may include an operation input portion such as a switch, a dial, a joystick, or a push button which is not illustrated. It is possible to dispose the voice output apparatus not illustrated at other positions which are different from the monitor apparatus 11 within the passenger compartment 2a, and it is possible to output the voice, from other voice output apparatuses which are different from the voice output apparatus 9 of the monitor apparatus 11. For example, the monitor apparatus 11 may be used as a navigation system or an audio system in combination.

A display apparatus 12 (see FIG. 3) which is separate from the display apparatus 8 is disposed within the passenger compartment 2a. For example, the display apparatus 12 is disposed in an instrument panel portion 26 (see FIG. 1) of the dashboard 25, and is positioned between a speed display portion and a rotation number display portion at substantially the center of the instrument panel portion 26. A size of the screen of the display apparatus 12 is smaller than that of the screen of the display apparatus 8. An image indicating information on the parking assist of the vehicle 1 may mainly be displayed in the display apparatus 12. Information amount which is displayed on the display apparatus 12, may be smaller than the information amount which is displayed on the display apparatus 8. For example, the display apparatus 12 may be an LCD, an OELD, or the like. The information which is displayed on the display apparatus 12 may be displayed on the display apparatus 8.

Figure 2:
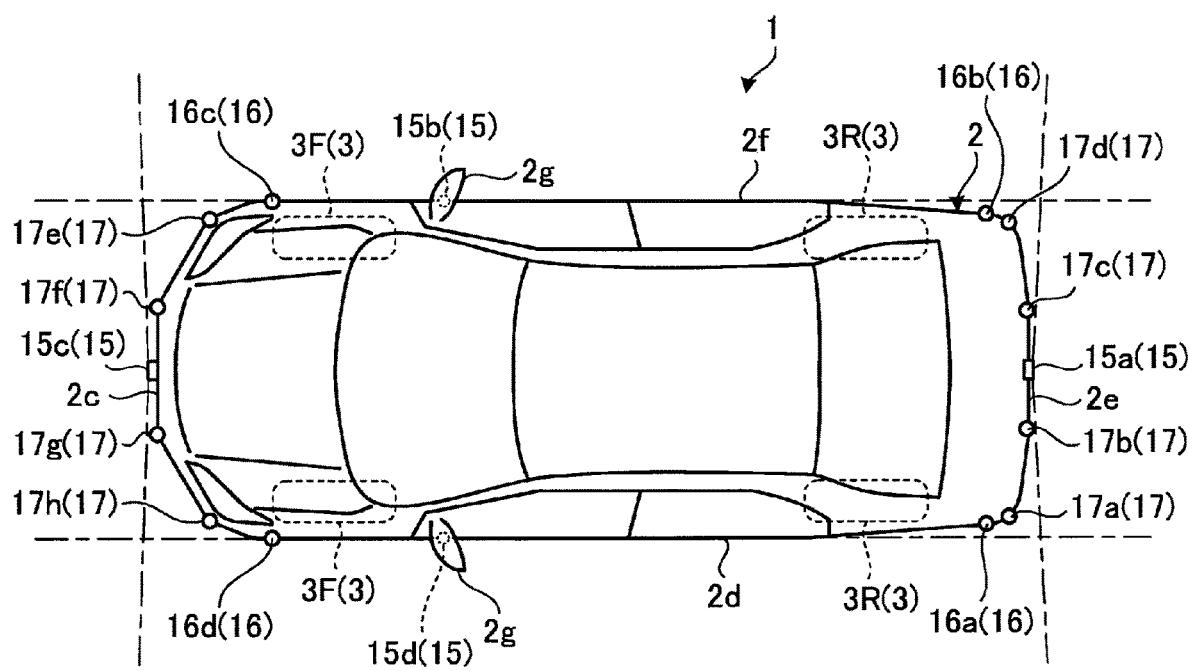
FIG. 2 is an exemplary plan view of the vehicle on which the parking assist apparatus according to the embodiment is mounted.
Figure 3:
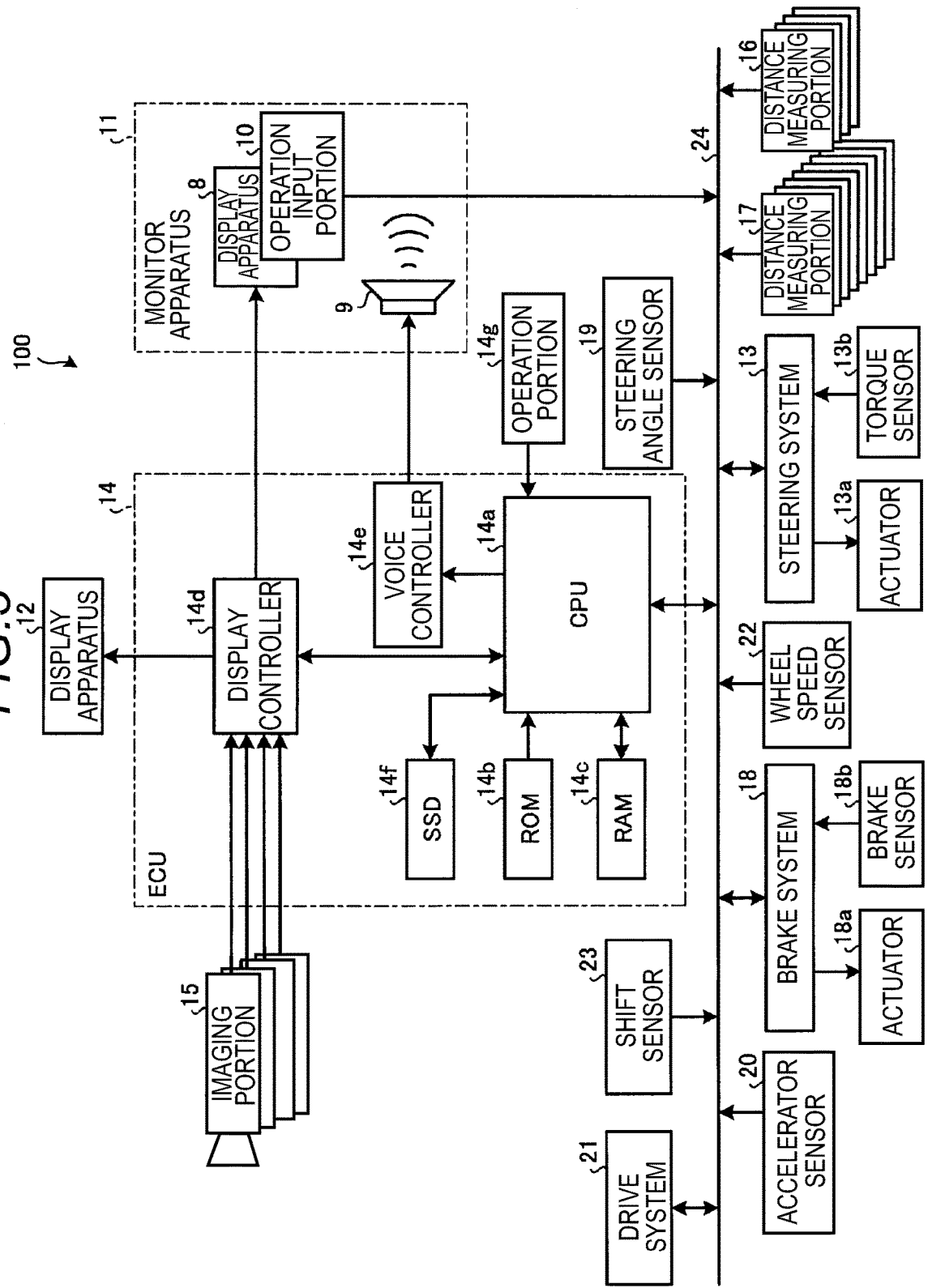
FIG. 3 is an exemplary block diagram of a configuration of a parking assist system including the parking assist apparatus according to the embodiment.

As illustrated in FIG. 1 and FIG. 2, for example, the vehicle 1 is a four-wheeled automobile, and has two left and right front wheels 3F and two left and right rear wheels 3R. All of the four wheels 3 may be configured to be turnably steerable. As illustrated in FIG. 3, the vehicle 1 includes a steering system 13 that steers at least two wheels 3. The steering system 13 has an actuator 13a, and a torque sensor 13b. The steering system 13 is electrically controlled by an electronic control unit (ECU) 14 or the like, and causes the actuator 13a to be operated. For example, the steering system 13 may be an electric power steering system, a steer by wire (SBW) system, or the like. The steering system 13 designates steering force by adding a torque, that is, an assist torque to the steering portion 4 by the actuator 13a, and causes the wheel 3 to be steered by the actuator 13a. In this case, the actuator 13a may steer one wheel 3, or may steer a plurality of wheels 3. For example, the torque sensor 13b detects the torque which is given to the steering portion 4 by the driver.

As illustrated in FIG. 2, for example, four imaging portions 15a to 15d as a plurality of imaging portions 15 are disposed in the vehicle body 2. For example, the imaging portion 15 may be a digital camera into which an imaging element such as a charge coupled device (CCD) or a CMOS image sensor (CIS) is incorporated. The imaging portion 15 can output moving image data at a predetermined frame rate. Each of the imaging portions 15 has a wide-angle lens or a fish-eye lens, and can capture the image of a range of 140° to 220° in a horizontal direction, for example. An optical axis of the imaging portion 15 is set to head obliquely downward. Accordingly, the imaging portion 15 sequentially captures the image of an external environment in the vicinity of the vehicle body 2 including a road surface on which the vehicle 1 is capable of being moved or an area in which the vehicle 1 is capable of being parked, and outputs the image thereof as captured image data.

For example, the imaging portion 15a is positioned at an end portion 2e on a rear side of the vehicle body 2, and is disposed in a wall portion below a door 2h of a rear trunk. For example, the imaging portion 15b is positioned at an end portion 2f on a right side of the vehicle body 2, and is disposed in a door mirror 2g on the right side. For example, the imaging portion 15c is positioned at an end portion 2c on a front side of the vehicle body 2, that is, on a frontward side in front and rear directions of the vehicle, and is disposed in a front bumper or the like. For example, the imaging portion 15d is positioned at an end portion 2d on a left side of the vehicle body 2, that is, on the left side in the vehicle width direction, and is disposed in the door mirror 2g as a protrusion portion on the left side. The ECU 14 executes arithmetic processing or image processing based on the image data which is obtained by the plurality of imaging portions 15, and may generate the image with a wider viewing angle or may generate the image of a virtual high-angle view when the vehicle 1 is viewed from above.

The ECU 14 identifies a mark line or the like which is viewed on the road surface in the vicinity of the vehicle 1, from the image of the imaging portion 15, and detects a parking partition indicated by the mark line or the like.

As illustrated in FIG. 1 and FIG. 2, for example, four distance measuring portions 16a to 16d, and eight distance measuring portions 17a to 17h, as a plurality of distance measuring portions 16 and 17, are disposed in the vehicle body 2. For example, the distance measuring portions 16 and 17 may be sonars which emit ultrasonic waves, and catch reflected waves thereof. The sonar may be referred to as a sonar sensor or an ultrasonic detector. By the detection results of the distance measuring portions 16 and 17, the ECU 14 may measure presence or absence of an object such as an obstacle which is positioned in the vicinity of the vehicle 1, and the distance up to the object. That is, the distance measuring portions 16 and 17 are merely an example of a detecting portion that detects the object. For example, the distance measuring portion 17 may be used for detecting the object at a relatively short distance, and the distance measuring portion 16 may be used for detecting the object at a relatively long distance which is distant from the distance measuring portion 17. For example, the distance measuring portion 17 may be used for detecting the objects on the front side and the rear side of the vehicle 1, and the distance measuring portion 16 may be used for detecting the object on the side of the vehicle 1.

As illustrated in FIG. 3, in the parking assist system 100, a brake system 18, a steering angle sensor 19, an accelerator sensor 20, a drive system 21, a wheel speed sensor 22, a shift sensor 23 and the like are electrically connected through an in-vehicle network 24 as an electric communication line, in addition to the ECU 14, the monitor apparatus 11, the steering system 13, or the distance measuring portions 16 and 17. For example, the in-vehicle network 24 is configured as a controller area network (CAN). The ECU 14 can control the steering system 13, the brake system 18, the drive system 21, by sending a control signal through the in-vehicle network 24. The ECU 14 can receive the detection results of the torque sensor 13b, the brake sensor 18b, the steering angle sensor 19, the distance measuring portions 16 and 17, the accelerator sensor 20, the shift sensor 23, and the wheel speed sensor 22, or an operation signal of the operation input portion 10, through the in-vehicle network 24.

For example, the ECU 14 includes a central processing unit (CPU) 14a, a read only memory (ROM) 14b, a random access memory (RAM) 14c, a display controller 14d, a voice controller 14e, a solid state drive (SSD) 14f of a flash memory or the like. For example, the CPU 14a can execute various sorts of arithmetic processing and controls such as image processing relating to the image which is displayed on the display apparatuses 8 and 12, determination of a parking target position of the vehicle 1 at the time of executing the parking assist, arithmetic (calculation) of a movement distance, arithmetic (calculation) of a target vehicle speed and a movement target position per time, the determination of presence or absence of interference with the object, and switching of the control of the vehicle 1 (switching between an automatic control and a release of the automatic control).

The CPU 14a can read out a program which is installed and stored in a nonvolatile storage apparatus such as the ROM 14b, and execute the arithmetic processing in accordance with the program. The RAM 14c temporarily stores various sorts of data used in the arithmetic by the CPU 14a. The display controller 14d mainly executes the image processing using the image data which is obtained by the imaging portion 15, or composition of the image data which is displayed on the display apparatus 8, in the arithmetic processing by the ECU 14. The voice controller 14e mainly executes the processing of the voice data which is output from the voice output apparatus 9, in the arithmetic processing by the ECU 14. The SSD 14f is a rewritable nonvolatile storage portion, and can store the data even in a case where OFF of a power source of the ECU 14 is performed. The CPU 14a, the ROM 14b, the RAM 14c and the like may be integrated in the same package. The ECU 14 may be configured to use other logical operation processors such as a digital signal processor (DSP) or a logic circuit, in replacement of the CPU 14a. A hard disk drive (HDD) may be disposed in replacement of the SSD 14f, and the SSD 14f or the HDD may be disposed separately from the ECU 14.

For example, the brake system 18 may be an anti-lock brake system (ABS) that prevents the brake from being locked, an electronic stability control (ESC) that prevents a sideslip of the vehicle 1 at the time of cornering, an electric brake system that reinforces force of the brake (executes brake assist), a brake by wire (BBW) or the like. The brake system 18 applies the braking force to the wheel 3, and the vehicle 1 through the actuator 18a. The brake system 18 can execute various sorts of control by detecting the lock of the brake, idling of the wheel 3, a sign of the sideslip or the like from a rotation difference between the left and right wheels 3. For example, the brake sensor 18b is a sensor that detects the position of a moving portion of the braking operation portion 6. The brake sensor 18b can detect the position of the brake pedal as a moving portion. The brake sensor 18b includes a displacement sensor.

For example, the steering angle sensor 19 is a sensor that measures a steering amount of the steering portion 4 such as a steering wheel. For example, the steering angle sensor 19 is configured by using a Hall element or the like. The ECU 14 obtains the steering amount of the steering portion 4 by the driver, or the steering amount of each wheel 3 at the time of automatic steering, from the steering angle sensor 19, thereby, executes various sorts of controls. The steering angle sensor 19 measures a rotation angle of a rotation portion which is included in the steering portion 4. The steering angle sensor 19 is an example of an angle sensor.

For example, the accelerator sensor 20 is a sensor that detects the position of the moving portion of the acceleration operation portion 5. The accelerator sensor 20 can detect the position of the accelerator pedal as a moving portion. The accelerator sensor 20 includes the displacement sensor.

The drive system 21 is an internal combustion engine (engine) system or a motor system as a drive source. The drive system 21 controls a fuel injection amount or an intake air amount of the engine, or an output value of the motor in accordance with a demand operation amount (for example, a stepping amount of the accelerator pedal) of the driver (user) which is measured by the accelerator sensor 20. Regardless of the operation of the user, it is possible to control the output value of the engine or the motor in cooperation with the controls of the steering system 13 and the brake system 18, in accordance with a running state of the vehicle 1.

The wheel speed sensor 22 is a sensor that is disposed in each wheel 3, and measures a rotation amount or the number of rotations per unit time of each wheel 3, and outputs a wheel speed pulse number indicating the measured number of rotations as a measurement value. For example, the wheel speed sensor 22 may be configured by using a Hall element or the like. Based on the measurement value obtained from the wheel speed sensor 22, the CPU 14a calculates the vehicle speed or a movement amount of the vehicle 1, and executes various sorts of controls. In a case where the vehicle speed of the vehicle 1 is calculated based on the measurement value of the wheel speed sensor 22 of each wheel 3, the CPU 14a determines the vehicle speed of the vehicle 1 based on the speed of the wheel 3 having the smallest measurement value among four wheels, and executes various sorts of controls. In a case where the wheel 3 having the measurement value which is large in comparison with other wheels 3 is present among four wheels, for example, in a case where the wheel 3 having the number of rotations of per unit period (unit time or unit distance) which is great as a predetermined number or more in comparison with other wheels 3 is present, the CPU 14a considers that the wheel 3 is in a slipping state (idling state), and executes various sorts of controls. The wheel speed sensor 22 may be disposed in the brake system 18. In that case, the CPU 14a obtains the detection result of the wheel speed sensor 22 through the brake system 18.

For example, the shift sensor 23 is a sensor that detects the position of the moving portion of the speed change operation portion 7. The shift sensor 23 can detect the position of a lever, an arm, or a button, as a moving portion. The shift sensor 23 may include the displacement sensor, or may be configured as a switch.

The configurations, the dispositions, or the electrical connection forms of various sorts of sensors and actuators described above are merely an example, and may be variously set (modified).

Figure 4:
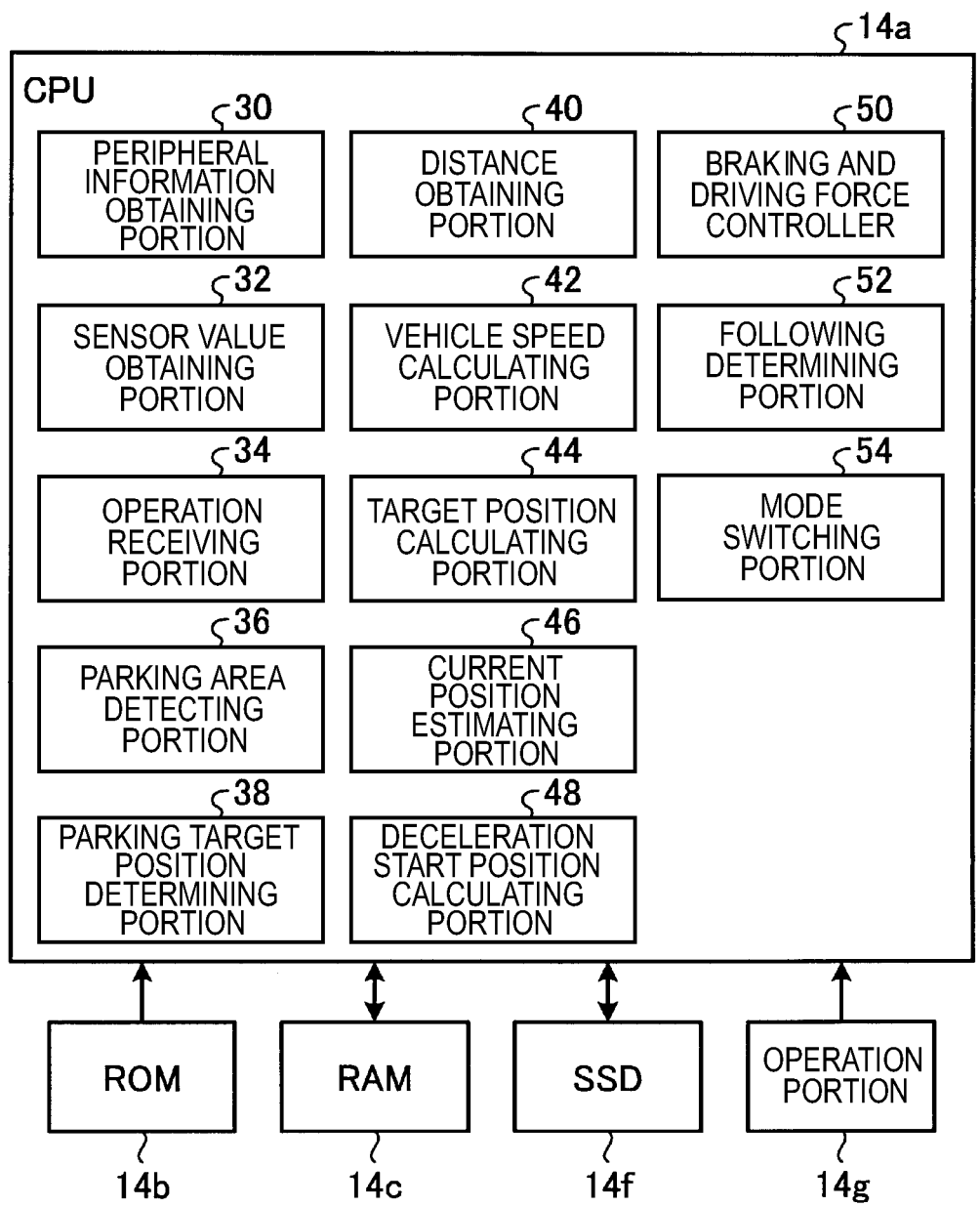
FIG. 4 is an exemplary block diagram of a configuration of a CPU of the parking assist system according to the embodiment.

The CPU 14a includes various sorts of modules that are realized by reading out the program installed and stored in the storage apparatus such as the ROM 14b, and executing the program. For example, the CPU 14a includes a peripheral information obtaining portion 30, a sensor value obtaining portion 32, an operation receiving portion 34, a parking area detecting portion 36, a parking target position determining portion 38, a distance obtaining portion 40, a vehicle speed calculating portion 42, a target position calculating portion 44, a current position estimating portion 46, a deceleration start position calculating portion 48, a braking and driving force controller 50, a following determining portion 52, a mode switching portion 54, and the like, as illustrated in FIG. 4.

The peripheral information obtaining portion 30 obtains the information which is provided from the imaging portion 15, or the distance measuring portions 16 and 17. For example, the information on presence or absence of the obstacle in the vicinity of the vehicle 1, the information on the position or the size thereof, the information on a border line or the mark line of the road surface, or the information on the vicinity of the vehicle 1 is obtained. The sensor value obtaining portion 32 obtains measurement values which are output from various sorts of sensors such as the brake sensor 18b, the steering angle sensor 19, the accelerator sensor 20, the wheel speed sensor 22, or the shift sensor 23, that is, the information indicating the state of the vehicle 1. The sensor value obtaining portion 32 may obtain the position information of the vehicle 1 from a global positioning system (GPS). In another embodiment, the movement distance of the vehicle 1, that is, the current position of the vehicle 1 may be calculated from the measurement value of the wheel speed sensor 22, a diameter of the wheel 3, the number of rotations of the wheel 3. Based on the obtained values of various sorts of sensors, the CPU 14a executes the calculation and the control for the control and the parking assist of the steering system 13, the brake system 18, or the drive system 21. The operation receiving portion 34 obtains the signal by the operation input of the operation portion 14g. For example, the operation portion 14g may be a push button or a switch, and can perform the demand or cancellation of the parking assist. The demand or cancellation of the parking assist may be performed through the operation input portion 10 of the display apparatus 8.

Figure 5:
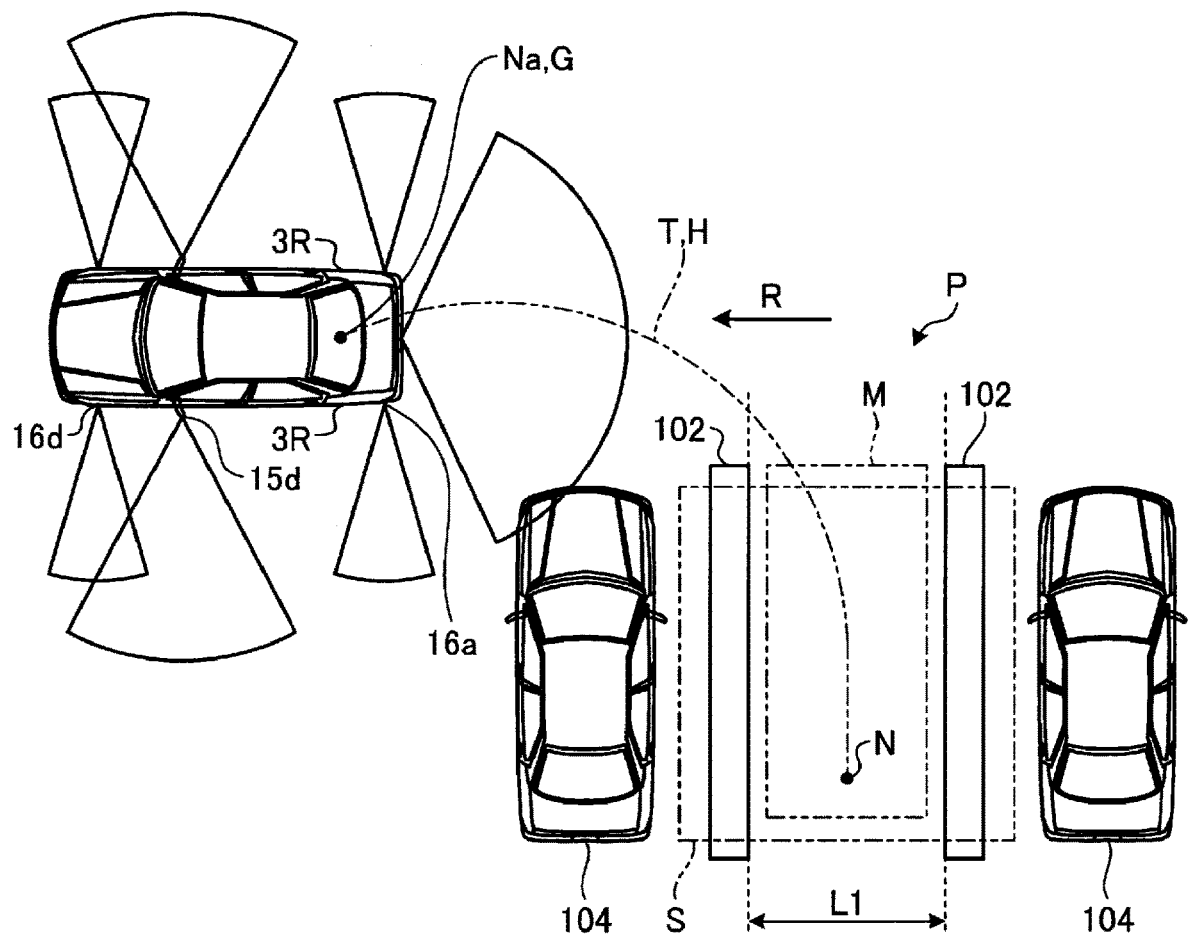
FIG. 5 is a top view schematically illustrating a movement state when the vehicle on which the parking assist apparatus according to the embodiment is mounted is moved to a parking target position.

The parking area detecting portion 36 detects an area where the parking is possible in a peripheral area of the vehicle 1, based on the obstacle, the border line, or the mark line which is detected by the peripheral information obtaining portion 30. As illustrated in FIG. 5, if the vehicle 1 enters a parking lot P, the driver runs the vehicle 1 at a low speed. The operation receiving portion 34 may receive the operation of the operation portion 14g at a predetermined speed or less (low speed), and receives the demand for the parking assist start with respect to the CPU 14a. If the operation receiving portion 34 receives the parking assist demand signal through the operation portion 14g, the parking area detecting portion 36 performs a search for the parking partition or space that may become the area where the parking is possible in the peripheral area of the vehicle 1 by using the information from the imaging portion 15, and the distance measuring portions 16 and 17 which is obtained by the peripheral information obtaining portion 30. For example, while the vehicle 1 runs at a low speed in the direction of an arrow R along an array direction of a mark line 102 in the parking lot P, by using the peripheral information obtained by the distance measuring portions 16 and 17, the position or the size of the object which becomes the obstacle at the time of guiding the vehicle 1 for the parking, that is, another vehicle 104 is detected. In this case, detection processing is performed by using the information from the distance measuring portions 16a and 16d on a left side surface of the vehicle 1. By mainly using the information from the imaging portion 15d on the left side surface of the vehicle 1, the position or an interval of the mark line 102 which is less likely to be detected by the distance measuring portions 16 and 17, and a depth of the mark line 102 are detected. In a case where the obstacle is not detected based on the information which is detected by the distance measuring portions 16 and 17, the parking area detecting portion 36 can determine that there is a room in the parking partition, that is, that a candidate for the area where the parking is possible is present. At this time, it is detected whether or not the distance between the mark lines 102 is larger than a parkable value L1 which is obtained by adding a predetermined margin distance to be secured on both sides of the vehicle side with the vehicle width of the vehicle 1. In a case where the distance between the mark lines 102 is the parkable value L1 or more, the parking area detecting portion 36 determines that the area is the candidate for the area where the parking is possible. On the contrary, in a case where the distance between the mark lines 102 is less than the parkable value L1, the parking area detecting portion 36 determines that the area is excluded from the candidate of the area where the parking is possible.

For example, in a case where another vehicle 104 is already parked in the parking partition, if it is determined that a separated distance of a space S between two vehicles 104 in the vehicle width direction is the parkable value L1 or more, the space S is detected as a candidate of the area where the parking is possible. A plurality of candidates for such an area where the parking is possible may be detected, or for example, one may be selected by the driver from the plurality of detected candidates, or the area where the parking is possible with the best condition from the detected candidates may be selected by the parking assist system 100. The detection may be ended at the point of time at which the area where the parking is possible is firstly detected, and the area may be used as an area for guiding the detection where the parking is possible.

The parking target position determining portion 38 sets a parking frame M corresponding to the size of the vehicle 1 in the determined area where the parking is possible, and sets a parking target position N. In a case where the vehicle 1 is parked in the parking frame M, for example, the parking target position N can be a position corresponding to the central position (reference position G) of the line which links the left and right rear wheels 3R of the vehicle 1. For example, if the parking frame M is determined on coordinates using the reference position G as an origin at a current position Na (assist start position) of the vehicle 1, it is possible to determine the parking target position N at one time. Therefore, if the vehicle 1 is moved (guided) such that the reference position G matches the parking target position N, it is possible to park the vehicle 1 at a suitable position of the parking frame M.

The distance obtaining portion 40 obtains the distance from the current position Na of the vehicle 1 to the parking target position N. For example, if the current position Na of the vehicle 1 and the parking target position N are determined, it is possible to calculate a most suitable path T by using a known path guidance technology. The distance obtaining portion 40 refers to the peripheral information (obstacle, another vehicle 104 or the like) which is obtained by the peripheral information obtaining portion 30, and calculates the most reasonable and most suitable path T through which the vehicle 1 can be moved from the current position Na to the parking target position N in a state of not being in contact with the obstacle or another vehicle 104, and securing a sufficient safety interval. Accordingly, the distance obtaining portion 40 also has a function as a path calculating portion. Based on the most suitable path T which is calculated, the distance obtaining portion 40 obtains a movement distance H which is expected when the vehicle 1 is moved along the most suitable path T. In the distance obtaining portion 40, other movement paths may be calculated as well, in addition to the most suitable path T, and may be selected by the driver. In this case, the distance obtaining portion 40 obtains the movement distance H based on the selected movement path. In this case, it is possible to perform the parking assist based on the path which is desired by the driver.

Figure 6:
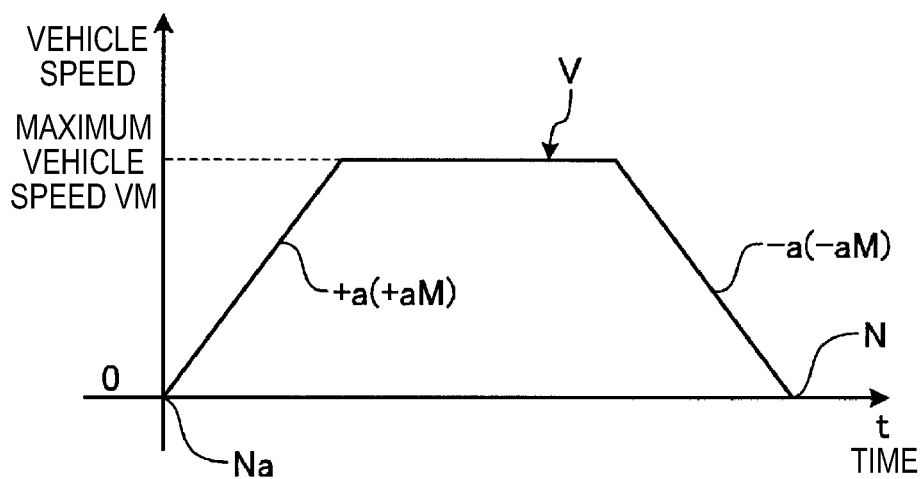
FIG. 6 is a diagram illustrating an example of a relationship between a vehicle speed and elapsed time in order to describe transition of a target vehicle speed which is calculated by the parking assist apparatus according to the embodiment.

Based on the movement distance H obtained by the distance obtaining portion 40, and the vehicle speed and acceleration and deceleration (±acceleration) which are set in advance, the vehicle speed calculating portion 42 calculates the target vehicle speed with a lapse of time until the vehicle 1 reaches the parking target position N from the current position Na. For example, the vehicle speed and acceleration and deceleration which are set in advance, are the vehicle speed of a maximum vehicle speed VM (m/s) or less and the acceleration and deceleration of a maximum acceleration and deceleration aM (±aM) (m/s$^2$) or less which are allowed in the parking assist, and are the vehicle speed and the acceleration and deceleration within a range in which the driver does not feel uncomfortable or uneasy when the automatic running (parking assist) of the vehicle 1 is executed, and the automatic running can be reasonably executed. FIG. 6 is a diagram illustrating an example of a relationship between the vehicle speed and elapsed time in order to describe transition of the target vehicle speed. As illustrated in FIG. 6, if the maximum vehicle speed VM, +acceleration a (m/s$^2$) and −deceleration a (m/s$^2$), and the movement distance H from the current position Na to the parking target position N are determined, it is possible to determine the target vehicle speed V with the lapse of time. FIG. 6 is an example in which the target vehicle speed V is calculated such that the acceleration and deceleration becomes the smooth acceleration and deceleration, as the feeling that ride comfortability is good, and is an example in which after the acceleration is performed at a fixed acceleration (+a), the vehicle 1 runs at a fixed speed (for example, the maximum vehicle speed VM), and the deceleration is performed at a fixed deceleration (−a), thereby, the vehicle 1 is stopped.

In another embodiment, the acceleration and deceleration may be gradually changed. For example, the gentle acceleration may be made at the beginning of acceleration, the maximum acceleration may be made in a middle period of acceleration, and the gentle acceleration may be made again in the end of acceleration. The deceleration is performed in the same manner. The acceleration may be linearly performed at the time of acceleration in the same manner as FIG. 6, and the deceleration may be gradually changed as described above. The acceleration and deceleration may be performed in the contrary manner thereto. The transition of the vehicle speed may be formed by an acceleration period and a deceleration period, and a fixed vehicle speed period may be omitted. In this manner, a transition pattern of the vehicle speed may be appropriately selected by the driver, a supplier of the parking assist apparatus, a vehicle supplier, or the like. In the same manner, the maximum vehicle speed VM and the maximum acceleration and deceleration ±aM may be appropriately selected. In this manner, the setting may be changed within the range in which the parking assist is safely possible, thereby, it is possible to realize the parking assist with the vehicle speed and the acceleration and deceleration which are fitted to preference of the user.

The vehicle speed calculating portion 42 estimates the current vehicle speed of the vehicle 1 during the parking assist. For example, it is possible to perform the estimation of the current vehicle speed based on the measurement value of the wheel speed sensor 22 which is obtained by the peripheral information obtaining portion 30. In a case where the vehicle 1 includes a speed sensor, the current vehicle speed may be estimated by using the measurement value of the speed sensor.

Figure 7:
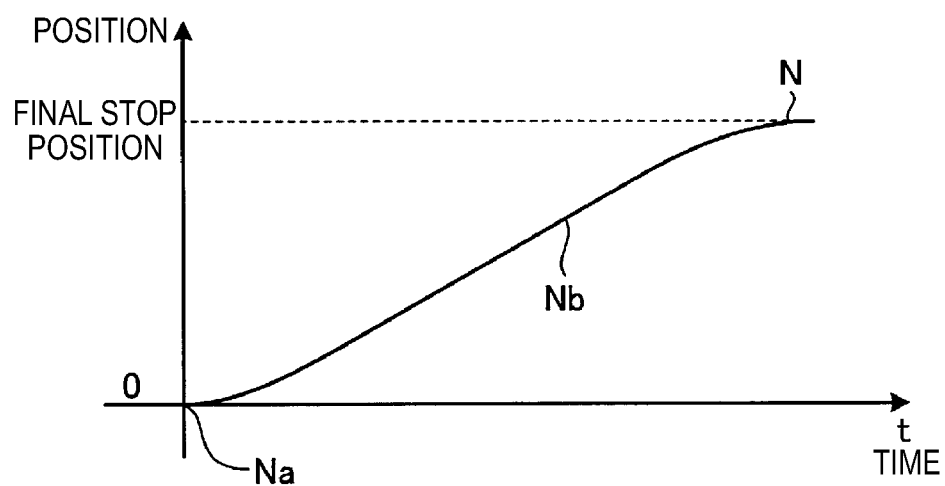
FIG. 7 is a diagram illustrating an example of a relationship between a position of the vehicle and elapsed time in order to describe transition of a movement target position which is calculated by the parking assist apparatus according to the embodiment.

The target position calculating portion 44 calculates a movement target position Nb of the vehicle 1 in accordance with the time until the vehicle 1 reaches the parking target position N, based on the target vehicle speed V with the lapse of time which is calculated by the vehicle speed calculating portion 42. The target position calculating portion 44 can calculate the movement target position Nb by sequentially integrating the target vehicle speed V which is calculated by the vehicle speed calculating portion 42. FIG. 7 is a diagram for describing the transition of the movement target position Nb corresponding to the target vehicle speed V illustrated in FIG. 6, and is a diagram illustrating an example of the relationship between the position of the vehicle 1 and the elapsed time.

For example, the current position estimating portion 46 estimates the current position of the vehicle 1. The current position estimating portion 46 can estimate the position at each time during the parking assist of the vehicle 1 by using the position information from the GPS which is obtained by the sensor value obtaining portion 32.

Figure 8:
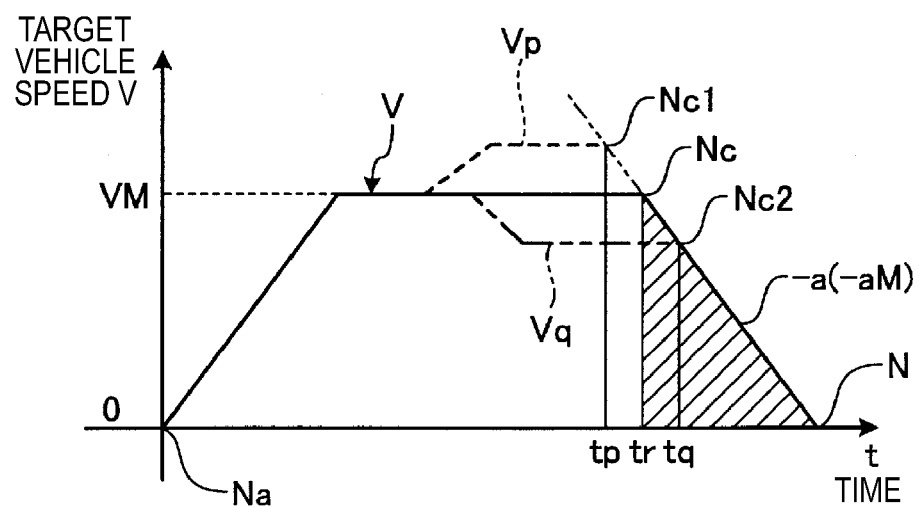
FIG. 8 is a diagram illustrating an example of a relationship between the target vehicle speed and elapsed time in order to describe a deceleration start position which is calculated by the parking assist apparatus according to the embodiment.

The deceleration start position calculating portion 48 calculates a deceleration start position Nc in which the deceleration is started such that the driver or the like does not feel discomfort when the vehicle 1 is stopped at the parking target position N. For example, the deceleration start position Nc is calculated such that the vehicle 1 reaches the parking target position N by performing the deceleration at a fixed deceleration (−a) from a state where the vehicle 1 runs at the maximum vehicle speed VM. FIG. 8 is a diagram illustrating an example of the relationship between the target vehicle speed V and the elapsed time in order to describe the calculation of the deceleration start position Nc. As described in FIG. 6 and FIG. 7, considering that the integration (area of a trapezoidal portion from time 0 to time t) of the target vehicle speed V becomes the movement target position Nb, an inclination of the deceleration portion becomes the target deceleration (−a). Therefore, if the deceleration is performed at the deceleration of −a from a deceleration start time tr, thereby, the vehicle 1 is stopped, the vehicle 1 advances as the area of the portion to which hatching is given in FIG. 8, and is stopped. That is, a stop distance Ds from the deceleration start is represented by the following (Expression 1).

$$Ds=(V/2)*(t-tr) \quad \text{(Expression 1)}$$

Since the inclination of the speed becomes the deceleration, the following (Expression 2) is formed.

$$a=V/(tr-t) \quad \text{(Expression 2)}$$

If (Expression 2) is substituted into (Expression 1), the following (Expression 3) is made.

$$Ds=-V^2/2a \quad \text{(Expression 3)}$$

Therefore, if the deceleration is started at the time on which a residual distance satisfies (Expression 3) of $V^2/2a$ with respect to the parking target position N, the vehicle 1 is stopped at the parking target position N.

During the parking assist, the driver operates the acceleration operation portion 5 (accelerator pedal), and increases the current vehicle speed, thereby, the current vehicle speed may be changed into a vehicle speed Vp. In this case, if the vehicle 1 does not reach the deceleration start position Nc, the parking assist (following control) is stopped once by priority of the operation intention of the driver. Although described later, even in this case, if the vehicle 1 approaches the parking target position N by the operation of the driver, the returning of the parking assist (following control) is performed. That is, if the deceleration is started at the timing (tp) on which the residual distance (Expression 3) is satisfied with respect to the parking target position N (corrected deceleration start position Nc1), the vehicle 1 may be stopped at the parking target position N. In this case, the deceleration is started earlier than the deceleration start time tr at the beginning (in a case where the accelerator operation is not performed), but it is possible to complete the parking assist. On the contrary, even in a case where the driver operates the braking operation portion 6 (brake pedal) during the parking assist, and the current vehicle speed is reduced, thereby, the current vehicle speed may be changed into a vehicle speed Vq, the parking assist is stopped once. In case of the returning thereafter, if the deceleration is started at the timing (tq) on which the residual distance (Expression 3) is satisfied with respect to the parking target position N (corrected deceleration start position Nc2), the vehicle 1 may be stopped at the parking target position N. In this case, the deceleration is started later than the deceleration start time tr at the beginning, but it is possible to complete the parking assist.

The braking and driving force controller 50 controls the drive system 21 and the brake system 18 such that the current position of the vehicle 1 estimated by the current position estimating portion 46 matches (follows) the movement target position Nb calculated by the target position calculating portion 44, and performs the position control (speed control) of the vehicle 1. At this time, the CPU 14a controls the steering system 13, and controls a running direction of the vehicle 1 (wheel 3) such that the vehicle 1 runs along the most suitable path T which is calculated by the distance obtaining portion 40.

Figure 9:
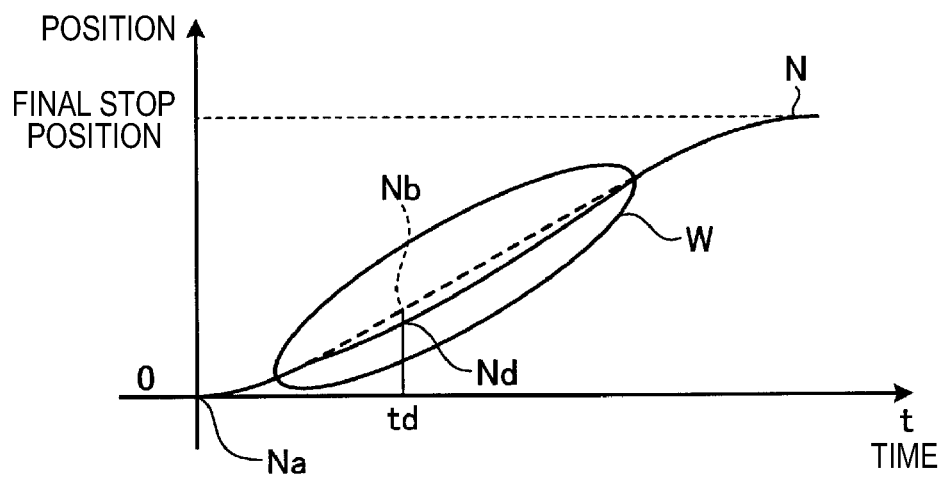
FIG. 9 is a diagram illustrating an example of a relationship between the movement target position and an actual position of the vehicle in a case where a following delay is generated, in a control by the parking assist apparatus according to the embodiment.

In a case where the vehicle 1 runs along the most suitable path T, the current position (movement position Nd) of the vehicle 1 may be delayed with respect to the movement target position Nb, due to various causes. FIG. 9 is a diagram illustrating an example of a relationship between the movement target position Nb and the actual movement position Nd of the vehicle 1 in a case where a following delay is generated. For example, in a case where the road surface has an upward gradient, or an unevenness is present on the road surface, the output which is controlled by the braking and driving force controller 50 in accordance with the movement target position Nb, may be not sufficient. That is, the movement of the vehicle 1 is delayed (for example, time td). Even in a case where the driver steps on the braking operation portion 6 (brake pedal), the movement of the vehicle 1 is delayed. In other words, the following delay is generated in a portion of an area W illustrated in FIG. 9. The following determining portion 52 can determine whether or not the following is possible with respect to the movement target position Nb by retrieving such a following delay.

The following determining portion 52 can carry out determining whether or not the following is possible, based on detection signals of various sorts of sensors which are mounted on the vehicle 1. In a case where the following delay is generated as illustrated in FIG. 9, in order to cause the vehicle 1 to follow the movement target position Nb, it is conceivable to make the instruction driving force large with respect to the vehicle 1. That is, the following determining portion 52 obtains the information on the size of the current demand driving force based on the detection signal of the accelerator sensor 20, and the information on presence or absence of the current braking force based on the detection signal of the brake sensor 18b, and determines whether or not the instruction drive can be increased during the parking assist. Specifically, if three conditions of a case where a divergence between the current movement position Nd of the vehicle 1 and the movement target position Nb is a predetermined first divergence value or more (condition 1), a case where the driving force of the vehicle 1 reaches a first driving force value which is allowed in the parking assist (condition 2), and a case where the braking force is not generated in the vehicle 1 (condition 3) are satisfied, it is determined that the vehicle 1 is not capable of running of following the movement target position Nb. It is possible to determine the first divergence value and the first driving force value by a test or the like in advance.

That is, the condition 1 is a condition for determining whether or not the increase of the driving force is necessary as the following delay is the first divergence value or more. In a case where the following delay is less than the first divergence value, the following delay may be regarded as a delay due to a measurement error or the like. The condition 2 is a condition for determining whether or not the increase of the driving force which is allowed during the parking assist by the operation of the acceleration operation portion 5 (accelerator pedal) is possible. In a case where the driving force by the operation of the acceleration operation portion 5 is less than the first driving force value, an additional operation of the acceleration operation portion 5 is possible, and it is possible to reduce the divergence due to the increase of the driving force. On the other hand, in a case where the driving force already reaches the first driving force value, the further increase of the driving force may not be expected during the parking assist. The condition 3 is a condition for determining whether or not the increase of the driving force is possible by a release of the braking operation portion 6 (brake pedal), that is, due to a loss of the braking force. If three conditions are satisfied, the following determining portion 52 determines that the current divergence is large, thereby, it is not possible to further increase the driving force, and determines that the irretrievable following delay is generated. On the other hand, if three conditions are not satisfied at the same time, the automatic control is continued by the braking and driving force controller 50. For example, in a case where the divergence is small, in a case where the additional accelerator operation is possible, or in the case where the reduction of the deceleration due to the release of the brake pedal, that is, the acceleration is possible, the following determining portion 52 determines that the following is possible with respect to the movement target position Nb. The following determining portion 52 can also determine whether or not the vehicle 1 actually follows the movement target position Nb, based on the comparison between the movement target position Nb and the current movement position Nd of the vehicle 1.

The mode switching portion 54 switches whether or not to stop the control (following control) of the running state, whether to continue the following control by adding the correction or whether to restart (return) the stopped following control, with reference to the result of determining whether or not the following is possible by the following determining portion 52, the current movement position Nd of the vehicle 1, or the running operation state. A mode for the following control based on the initial target vehicle speed V may be referred to as "normal mode", and a mode for continuing the following control by adding the correction to the target vehicle speed V or the movement target position Nb may be referred to as "limit mode". Therefore, the mode switching portion 54 can perform the switching in three modes of the switching between "normal mode" and "limit mode", and "stop mode" for stopping the following control.

Specifically, even in a case where it is determined that the following running is not possible because the conditions 1, 2, and 3 described above are satisfied at the same time, the vehicle 1 may not yet reach the deceleration start position Nc (see FIG. 8) which is calculated by the deceleration start position calculating portion 48. In this case, in a case where a signal indicating the operation (running operation) of the acceleration operation portion 5 (accelerator pedal) or the braking operation portion 6 (brake pedal) by the driver is detected by the peripheral information obtaining portion 30, the mode switching portion 54 stops the following control (parking assist control, position control, automatic control) based on the movement target position Nb once (stop mode). In other words, if the vehicle 1 is distant from the parking target position N, the running is allowed in accordance with the demand of the driver, and the driver is less likely to feel uncomfortable or uneasy. Even in a case where it is determined that the following running is not possible, if the running operation is not detected, the mode switching portion 54 continues the control of the vehicle running state in accordance with the new target vehicle speed V which is corrected in accordance with the following state with respect to the movement target position Nb of the vehicle 1 (limit mode). In this case, for example, it is possible to estimate that the road surface has the upward gradient, or the unevenness is present on the road surface. Therefore, by making the current vehicle speed of the vehicle 1 into the new target vehicle speed V, it is possible to continue the following control (parking assist control, following control, automatic running) onto which the state of the road surface is reflected.

If any one of the conditions 1, 2, and 3 is not satisfied, in a state where it is determined that the following running is not possible, for example, in a case where the divergence value is reduced, in a case where the driving force of the vehicle 1 is reduced, or in a case where the braking force is generated to be a predetermined value or more, the mode switching portion 54 determines that the following running is possible. In a case where it is determined that the conditions 1, 2, and 3 described above are not satisfied, if the same threshold is used, the following determining portion 52 may repeatedly perform the determination that "following running is not possible", and the determination that "following running is possible", in the vicinity of the threshold. If at least one of a case where the divergence becomes a second divergence value which is smaller as a predetermined amount than the first divergence value, a case where the driving force of the vehicle 1 becomes a second driving force value which is lower as a predetermined amount than the first driving force value, and a case where the braking force of the vehicle 1 becomes a predetermined braking force value or more is satisfied, the following determining portion 52 switches the determination into the determination that the following running is possible. In other words, once, in a case where it is determined that the following running is not possible, the condition which is corrected by the determination that the following running is possible is made stricter, and the switching (switching of the control) between "normal mode" and "limit mode" based on the following determination is made not to be repeatedly and frequently generated. That is, the frequent switching of the control state is prevented, and the driver or the like is less likely to feel uncomfortable.

In a case where the control (following control) of the running state of the vehicle 1 is stopped (stop mode), if the vehicle 1 reaches the predetermined deceleration start position Nc with respect to the parking target position N, the mode switching portion 54 restarts (returns to) the control of the vehicle running state based on the target vehicle speed V. In other words, if the vehicle 1 is close to the parking target position N, the mode switching portion 54 returns to the control (normal mode or limit mode) of the vehicle running state regardless of the operation of the user (driver), and the vehicle 1 is reliably moved to the parking target position N. Even in this case, if the CPU 14a determines that an obstacle having a possibility of being in contact with the vehicle 1 is present in the vicinity of the vehicle 1 based on the detection results of the imaging portion 15 and the distance measuring portions 16 and 17 through the peripheral information obtaining portion 30, the vehicle 1 is stopped, and the user is notified of the presence of the obstacle by using the display apparatus 8 or the voice output apparatus 9.

In a case where the mode switching portion 54 returns the following control, the operation of the acceleration operation portion 5 (accelerator pedal) or the braking operation portion 6 (brake pedal) is perform by the driver hitherto, as a result, the movement position Nd may deviate largely with respect to the movement target position Nb. In this case, if the movement position Nd is made to return to the movement target position Nb before the following control is stopped, the excessive acceleration and deceleration is performed, thereby, ride comfortability may be lowered. In a case where the control of the vehicle running state returns to the following control, the target position calculating portion 44 can make the current position of the vehicle 1 into the movement target position Nb at the time of control returning.

Figure 10:
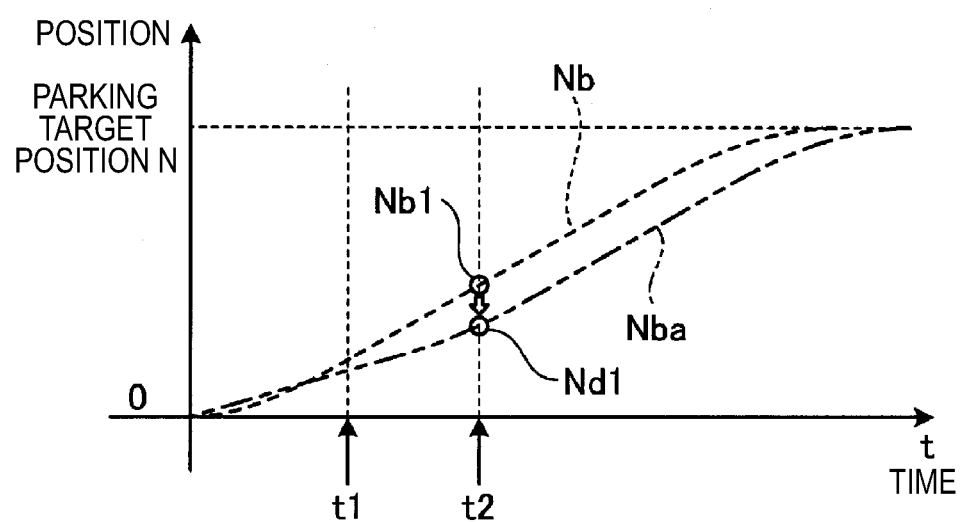
FIG. 10 is a diagram for describing an example in which the movement target position is calculated and corrected from a current position at the time of returning to a following control for controlling a vehicle running state, in the control by the parking assist apparatus according to the embodiment.

FIG. 10 is a diagram for describing an example in which the movement target position Nb is corrected by calculating the current position of the vehicle 1 at the time of returning to the following control. As described above, for example, in a case where the mode switching portion 54 determines that there is the operation of the acceleration operation portion 5 (accelerator pedal) or the braking operation portion 6 (brake pedal) by the driver, the mode switching portion 54 stops the following control (position control) (stop mode, for example, time t1). In a case where the following control is stopped, the stop of the following control is continued until the return condition is satisfied. During the stop of the following control, in a case where the brake operation is canceled (return condition 1), in a case where the accelerator operation is canceled (return condition 2) or in a case where the current movement position Nd of the vehicle 1 reaches the deceleration start position Nc (return condition 3, see FIG. 8) (for example, time t2), the following determining portion 52 returns to the following control. In this case, as illustrated in FIG. 10, a new movement target position Nba is calculated and corrected by making a current movement position Nd1 in which the vehicle 1 is actually present as a reference at the time of returning to the following control from a movement target position Nb1 (time t2) in a case where the following control is continued without being stopped. In this case, for example, the inclination of the transition of the movement target position Nb may be used as an inclination of the transition of the new movement target position Nba. As a result, it is possible to prevent the sharp acceleration and deceleration from being generated even at the time of returning the following control, in a state where the movement target position Nb1 and the movement position Nd1 of the vehicle 1 diverge from each other. In this case, the returning becomes the returning in the limit mode. The movement target position Nba is calculated and corrected, as a result, the time at which the vehicle 1 arrives in the parking target position N may be delayed rather than the time at which the vehicle 1 is scheduled to arrive in the initial movement target position Nb. In case of FIG. 9, the following delay is generated, thereby, the mode is switched from "normal mode" into "limit mode", but while the vehicle 1 is moved in "limit mode", the divergence between the movement target position Nb and the movement position Nd is shrunk (disappears), and the mode is switched into "normal mode" before the vehicle 1 reaches the deceleration start position Nc. Therefore, in the example of FIG. 9, the time at which the vehicle 1 arrives in the parking target position N is the same as the time at which the vehicle 1 is scheduled to arrive in the initial movement target position Nb.

Each of the modules described above is merely an example, and the CPU 14a may be any so long as the same function can be realized, as a whole of the CPU 14a. For example, a plurality of modules may be integrated. As an example, the braking and driving force controller 50, the following determining portion 52, and the mode switching portion 54 may be configured by one module as a "controller". On the contrary, each module may be further subdivided by the separate functions, and may be divided into the plurality of modules.

Details of assist processing by the parking assist apparatus (parking assist system 100) which is configured as described above, will be described based on a flowchart of FIG. 11.

Regarding the parking assist, in a case where the vehicle 1 enters the parking lot or the area in which the parking is permitted, and the operation of the switch (for example, the operation portion 14g, parking assist SW) to demand the parking assist start with the driver is received by the operation receiving portion 34 (Yes in S100), the parking assist control is started. In a case where the operation of the switch to demand the parking assist start is not received by the operation receiving portion 34 (No in S100), the flow is ended once. If the demand for the parking assist start is received by the operation receiving portion 34, the parking target position determining portion 38 sets the parking target position N in the parking area that is detected by the parking area detecting portion 36, based on the peripheral situation information of the vehicle 1 which is obtained by the peripheral information obtaining portion 30 (S102). If the parking target position N is set, the distance obtaining portion 40 sets the most suitable path T from the current position Na of the vehicle 1 to the parking target position N by using a known path setting method, and obtains the movement distance H from the current position Na to the parking target position N (S104). Subsequently, the vehicle speed calculating portion 42 calculates the target vehicle speed V with the lapse of time until the vehicle 1 reaches the parking target position N, based on the movement distance H, and the maximum vehicle speed and the maximum acceleration and deceleration which are set in advance (S106).

The target position calculating portion 44 calculates the movement target position Nb per elapsed time by sequentially integrating the target vehicle speed V which is calculated by the vehicle speed calculating portion 42 (S108). As described in FIG. 8, the deceleration start position calculating portion 48 calculates the deceleration start position Nc at which the vehicle 1 starts the deceleration to be stopped at the parking target position N (S110). The current position estimating portion 46 estimates the movement position Nd (actual position) at each time during the parking assist of the vehicle 1 by using the position information from the GPS which is obtained by the sensor value obtaining portion 32 (S112). The vehicle speed calculating portion 42 estimates the current vehicle speed of the vehicle 1 based on the measurement value of the wheel speed sensor 22 which is obtained by the peripheral information obtaining portion 30 (S114). Before the parking assist is started, for example, in a case where the vehicle 1 is stopped, the stop position is estimated as a current position, and the vehicle speed of "0" is estimated as a current vehicle speed.

Subsequently, the following determining portion 52 performs the following determination (S116). That is, as described before, if three conditions of a case where the divergence between the current movement position Nd of the vehicle 1 and the movement target position Nb is the predetermined first divergence value or more (condition 1), a case where the driving force of the vehicle 1 reaches the first driving force value which is allowed in the parking assist (condition 2), and a case where the braking force is not generated in the vehicle 1 (condition 3) are satisfied, the following determining portion 52 determines that the vehicle 1 is not capable of running of following the movement target position Nb (No in S116). On the contrary, if three conditions are not satisfied, it is determined that the following is possible (Yes in S116). In a case where it is determined that the following is possible, the braking and driving force controller 50 executes the position control (following control, normal mode) by controlling the brake system 18 and the drive system 21 such that the vehicle 1 can be moved to the movement target position Nb (S118). If the position control is executed, as described in FIG. 6 to FIG. 8, for example, in a case where an acceleration control or a constant speed control is executed in order to realize the target vehicle speed V, and the vehicle 1 reaches the deceleration start position Nc, a deceleration control is executed. In a case where the vehicle 1 reaches the parking target position N (Yes in S120), it is determined that the parking assist is completed, thereby, the flow is ended. On the other hand, in a case where the vehicle 1 does not reached the parking target position N (No in S120), the processing returns to S112, and the estimation of the current movement position Nd of the vehicle 1 is performed, and the subsequent processing is repeated, thereby, the vehicles 1 is automatically moved up to the position of the parking target position N. In the flow, since the divergence between the movement target position Nb and the movement position Nd is considered to be not present in the initial processing of S116, it is determined that the following is possible.

In this manner, according to the parking assist apparatus of the embodiment, for example, since the target vehicle speed V of the vehicle 1 is calculated such that the acceleration and deceleration becomes the smooth acceleration and deceleration as the feeling that the ride comfortability is good (the discomfort is less likely to be felt), and the movement target position Nb is calculated based on the target vehicle speed V thereof, it is possible to smoothly move the vehicle 1 up to the parking target position N by avoiding the excessive acceleration and deceleration.

In S116, in a case where the following determining portion 52 determines that the following running is not possible since the condition 3 from the condition 1 are satisfied (No in S116), that is, in a case where the it is determined that the following delay is generated, the following determining portion 52 determines whether or not the current movement position Nd of the vehicle 1 reaches the deceleration start position Nc which is calculated by the deceleration start position calculating portion 48, and in a case where the vehicle 1 reaches the deceleration start position Nc (Yes in S122), the processing proceeds to S118, and the position control is continued. In other words, even in a case where the following delay is generated, since there is a need for the deceleration if the vehicle 1 approaches to the position of a predetermined distance from the parking target position N, the following control is continued, and the vehicle 1 is moved to the parking target position N, thereby, the parking assist is completed. In this case, since the deceleration start is delayed due to the following delay, the parking assist completion is delayed in comparison with a case where the following delay is not present, but the parking assist is completed.

On the other hand, in a case where the vehicle 1 does not reach the deceleration start position Nc (No in S122), the mode switching portion 54 refers to the detection results of various sorts of sensors which are obtained by the sensor value obtaining portion 32, and determines whether or not the running operation is currently performed (S124). In a case where there is the running operation (Yes in S124), for example, in a case where there is the operation of the acceleration operation portion 5 (accelerator pedal) or the braking operation portion 6 (brake pedal), it is estimated that the driver cancels the automatic running for some reason or other, and the driver wants to perform the running operation for oneself, and the mode switching portion 54 performs OFF of the position control (following control) once (S126). That is, the position control is switched into "stop mode". In this case, the control OFF indicates the braking and driving force control, and the CPU 14a may continue the control of the steering system 13, such that that the vehicle 1 can be moved along the most suitable path T which is calculated by the distance obtaining portion 40.

Even in a case where the mode switching portion 54 performs OFF of the position control, if the return condition is satisfied, there is a case where the position control returns. Therefore, the current position estimating portion 46 continuously performs the estimation of the current movement position Nd of the vehicle 1 at the time of the control OFF (stop) based on the position information or the like from the GPS which is obtained by the sensor value obtaining portion 32 (S128). In the same manner, the vehicle speed calculating portion 42 continuously performs the estimation of the current vehicle speed of the vehicle 1 at the time of the control OFF based on the detection information from the wheel speed sensor 22 which is obtained by the sensor value obtaining portion 32 (S130). The parking target position determining portion 38 calculates a corrected movement target position to be used in a case where the position control returns, based on the current vehicle speed of the vehicle 1, a residual distance to the parking target position N, and the like (S132). As illustrated in FIG. 8, the deceleration start position calculating portion 48 calculates the corrected deceleration start position Nc1 if the vehicle 1 runs at the vehicle speed Vp or the corrected deceleration start position Nc2 if the vehicles 1 runs at the vehicle speed Vq (S134). In the flowchart illustrated in FIG. 11, the processing which is from S128 to S134 is illustrated in the same flow as other processing, but as a subroutine, the corrected target position or the corrected deceleration start position may be calculated at all times.

In a case where the return condition is satisfied after OFF of the position control is performed in S126, for example, in a case where the brake operation is canceled (return condition 1), and the accelerator operation is canceled (return condition 2), it is determined that the return conditions of the position control are satisfied (Yes in S136), the processing proceeds to S118, and the position control is executed. In this case, as described in FIG. 10, the new movement target position Nba which is calculated in S132 is used by making the current movement position Nd1 in which the vehicle 1 is actually present as a reference. In other words, the position control (following control) returns in "limit mode". As a result, in a state where the movement target position Nb1 and the movement position Nd1 of the vehicle 1 diverge from each other, it is possible to return to the following control, and it is possible to prevent the sharp acceleration and deceleration from being generated at the time of the returning. That is, even in a case where the following control is restarted, it is possible to realize the control as the feeling that the ride comfortability is good. In this case, the movement target position Nba is calculated and corrected, as a result, the time at which the vehicle 1 arrives in the parking target position N is delayed rather than the time at which the vehicle 1 is scheduled to arrive in the initial movement target position Nb.

In a case where it is determined that the return conditions 1 and 2 (accelerator OFF, brake OFF) are not satisfied in S136 (No in S136), the processing proceeds to S120. In this case, if the vehicle 1 reaches the parking target position N with the operation of the driver as it is, a series of parking assist processing is ended. In a case where the vehicle 1 does not reach the parking target position N, the processing proceeds to S112. In this case, since the operation of the driver is continued, the determination of S116 becomes that the following is not possible, and the processing proceeds to S122. At this point in time, if the vehicle 1 reaches the corrected deceleration start position which is calculated in S134 (Yes in S136), the processing proceeds to S118, and the following control in the limit mode is restarted. In a case where the vehicle 1 does not reach the corrected deceleration start position which is calculated in S134 (No in S136), OFF of the position control is continued (S126), and the subsequent processing is executed. Accordingly, in the flowchart of FIG. 11, it is determined whether or not the return condition 3 is satisfied in S122. In another embodiment, the determination of whether or not the return condition 3 is satisfied may be performed in the processing of S136.

In S124, in a case where there is no running operation by the driver (No in S124), that is, in a case where the cause of the divergence with respect to the movement target position Nb is not the operation (accelerator operation or brake operation) of the driver, it is possible to estimate that the state of the road surface is the cause of the divergence. For example, in a case where the road surface is the upward slope, the driving force which is instructed by the braking and driving force controller 50 is not sufficient, and the actual vehicle speed of the vehicle 1 becomes slow with respect to the target vehicle speed V calculated by the target position calculating portion 44. The situation which is similar thereto is generated even in a case where there is a need to overcome the unevenness which is present on the road surface. In this case, the target vehicle speed is corrected in accordance with the following state with respect to the movement target position Nb of the vehicle 1 (S138), the processing proceeds to S108, thereby, the movement target position Nb is calculated and corrected, and the following running control of the vehicle 1 is continued. In this case, the mode switching portion 54 switches the control mode such that the following control is executed in "limit mode". In this case, it is possible to continue the following with respect to the movement target position Nb without accompanying the excessive acceleration and deceleration.

Figure 11:
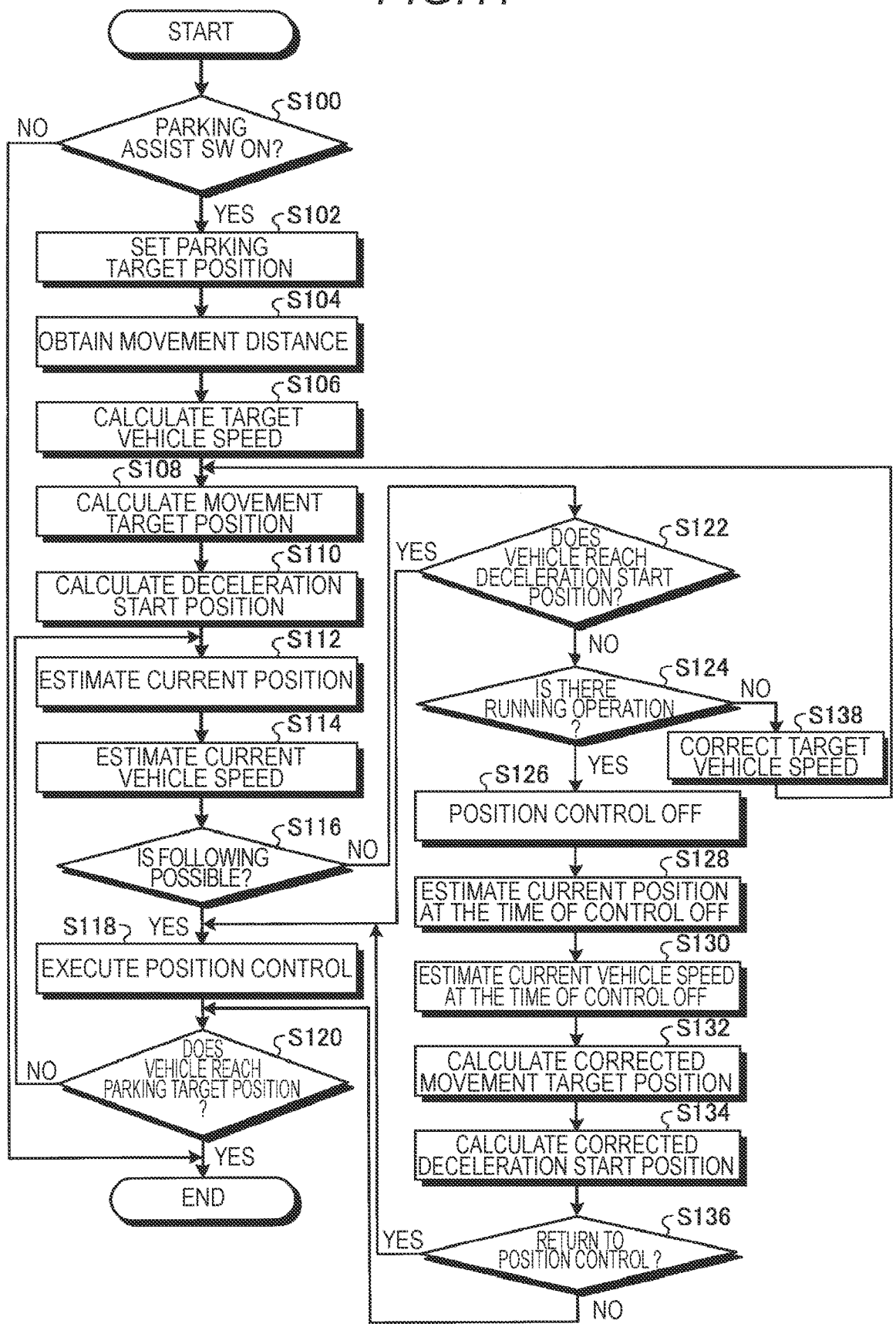
FIG. 11 is a flowchart for describing details of assist processing by the parking assist apparatus according to the embodiment.

In S138 of the flowchart illustrated in FIG. 11, the example in which the current vehicle speed is made into a new target vehicle speed V is illustrated, but the target vehicle speed V is not limited to the current vehicle speed, and even if the target vehicle speed V is corrected into the preset vehicle speed, it is possible to obtain the same effect.

In this manner, according to the parking assist system 100 of the embodiment, since the target vehicle speed of the vehicle 1 is calculated such that the acceleration and deceleration becomes the smooth acceleration and deceleration as the feeling that the ride comfortability is good (the discomfort is less likely to be felt), and the movement target position Nb is calculated based on the target vehicle speed thereof, it is possible to smoothly move the vehicle 1 up to the parking target position N by avoiding the excessive acceleration and deceleration.

According to the parking assist system 100 of the embodiment, in a case where the vehicle is not capable of following the movement target position Nb, a factor thereof is divided into whether to be caused by an environmental change (such as the state of the road surface) or whether to be caused by the operation (will) of the driver, and the switching is made between whether to correspond with "limit mode" in which the movement target position Nb or the target vehicle speed V is corrected or "normal mode" in which the correction is not added, and whether to correspond with "stop mode" in which the operation (accelerator operation, brake operation) of the driver or a creep output value is output as it is, thereby, it is possible to realize the control along with the will of the driver.

The parking assist program which is executed by the CPU 14a of the embodiment, may be configured to be provided as an installable format or an executable format by being recorded in a recording medium such as a CD-ROM, a flexible disk (FD), a CD-R, or a DVD (Digital Versatile Disk) which is readable by a computer.

The parking assist program may be configured to be provided by being stored on the computer which is connected to the network such as the Internet, or being downloaded via the network. Moreover, the parking assist program which is executed in the embodiment, may be configured to be provided or distributed via the network such as the Internet.

In the embodiment, an action state during the parking assist may be notified. In this case, the action state may be displayed in the display apparatus 8 or the display apparatus 12, or the notification of the same content may be carried out with the voice by using the voice output apparatus 9. By notifying of the action state during the parking assist, in a case where the vehicle 1 automatically runs, it is possible to easily grasp the situation thereof by the driver, and it is possible to provide the parking assist with a sense of security which is further improved.

The embodiments and modification examples of this disclosure are described, but the embodiments and modification examples are offered as an example, and do not intend to limit the scope of this disclosure. The novel embodiments may be carried out in various other forms, and it is possible to variously perform omissions, substitutions, or modifications without departing from the gist of this disclosure. The embodiments and modification examples are included in the scope or the gist of this disclosure, and are included in this disclosure which is written in the claims, and the scope which is equivalent thereto.

A parking assist apparatus according to an aspect of this disclosure includes a distance obtaining portion that obtains a movement distance from a current position of a vehicle to a parking target position, a vehicle speed calculating portion that calculates a target vehicle speed with a lapse of time until the vehicle reaches the parking target position, based on the movement distance, and a vehicle speed and acceleration and deceleration which are set in advance, a position calculating portion that calculates a movement target position of the vehicle in accordance with the time until the vehicle reaches the parking target position, based on the target vehicle speed with the lapse of time, and a controller that controls a vehicle running state such that the vehicle is moved to the movement target position at the target vehicle speed. According to such a configuration, for example, since the target vehicle speed of the vehicle is calculated such that the acceleration and deceleration becomes the smooth acceleration and deceleration as the feeling that ride comfortability is good (discomfort is less likely to be felt), and the movement target position is calculated based on the target vehicle speed thereof, it is possible to smoothly move the vehicle up to the parking target position by avoiding the excessive acceleration and deceleration.

In the parking assist apparatus according to the aspect of this disclosure, in a case where the controller determines that running of following the movement target position is not possible based on the current position of the vehicle and the movement target position, if a running operation of the vehicle is detected, the controller may stop a control of the vehicle running state, and if the running operation is not detected, the controller may continue the control of the vehicle running state in accordance with the target vehicle speed which is corrected in accordance with a following state with respect to the movement target position of the vehicle. According to such a configuration, for example, in a case where it is determined that a host vehicle is not capable of running of following the movement target position, the control is switched in accordance with a cause thereof whether to be caused by a running operation of a driver (user), for example, an accelerator operation or a brake operation, or whether to be caused by an external factor such as a road surface gradient or an unevenness state.

As a result, it is possible to execute the control that is suitable for the current situation on which a will of the driver is reflected.

In the parking assist apparatus according to the aspect of this disclosure, in a case where a divergence between the current position of the vehicle and the movement target position is a predetermined first divergence value or more, in a case where driving force of the vehicle reaches a first driving force value which is allowed in parking assist, and in a case where braking force is not generated in the vehicle, the controller may determine that the vehicle is not capable of running of following the movement target position. According to such a configuration, for example, since it is determined that the following running is not possible in a case where a plurality of conditions are satisfied, even in a case where a noise or the like is affected when the state of the vehicle or a peripheral situation of the vehicle is detected by a sensor or the like, it is possible to reduce a possibility in which the control state is immediately switched by erroneously determining that the vehicle is not capable of running of following the movement target position.

In the parking assist apparatus according to the aspect of this disclosure, in a case where the controller determines that the following running is not possible, if at least one of a case where the divergence becomes a second divergence value which is smaller as a predetermined amount than the first divergence value, a case where the driving force of the vehicle becomes a second driving force value which is lower as a predetermined amount than the first driving force value, and a case where the braking force of the vehicle becomes a predetermined braking force value or more is satisfied, the controller may determine that the following running is possible. According to such a configuration, for example, after it is determined that the following running is not possible, even if the divergence state is shrunk, and reaches the first divergence value, the determination is not switched into the determination that the following running is possible, and it is determined that the following running is possible at the second divergence value or more. That is, it is possible to avoid inconvenience of determining whether or not the following is possible is repeatedly generated in the vicinity of the first divergence value, and the control is repeatedly switched based on the determination.

In the parking assist apparatus according to the aspect of this disclosure, in a case where the controller determines that the following running is not possible, if the controller continues the control of the vehicle running state in accordance with the target vehicle speed which is corrected in accordance with the following state with respect to the movement target position of the vehicle, the controller may make the current vehicle speed of the vehicle into the corrected target vehicle speed. According to such a configuration, it is possible to continue the following with respect to the movement target position, without accompanying the excessive acceleration and deceleration. The current vehicle speed is made into the target vehicle speed, thereby, it is possible to set a new movement target position in which the following is likely to be performed, and it is possible to easily prevent expansion of the divergence with respect to the movement target position.

In the parking assist apparatus according to the aspect of this disclosure, in a case where the controller causes the control of the vehicle running state to return if the running operation is not detected, the controller may make the current position of the vehicle into the movement target position at the time of control returning. According to such a configuration, even in a case where the current position of the vehicle greatly diverges from the initial movement target position by the operation of the driver (user), the control is continued at the new movement target position without forcedly returning to the position. As a result, it is possible to continue the following control, without accompanying the excessive acceleration and deceleration.

In the parking assist apparatus according to the aspect of this disclosure, in a case where the controller stops the control of the vehicle running state by determining that the following running is not possible, if the vehicle reaches a predetermined deceleration start position with respect to the parking target position, the controller may restart the control of the vehicle running state based on the target vehicle speed. According to such a configuration, in a case where the vehicle approaches the parking target position, since the control of the vehicle running state is restarted regardless of the operation of the driver (user), it is possible to reliably move the vehicle to the parking target position.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assist apparatus comprising:
    a distance obtaining portion that obtains a movement distance from a current position of a vehicle to a parking target position;
    a vehicle speed calculating portion that calculates a target vehicle speed with a lapse of time until the vehicle reaches the parking target position, based on the movement distance, and a vehicle speed and acceleration and deceleration which are set in advance;
    a position calculating portion that calculates a movement target position of the vehicle in accordance with the time until the vehicle reaches the parking target position, based on the target vehicle speed with the lapse of time; and
    a controller that controls a vehicle running state such that the vehicle is moved to the movement target position at the target vehicle speed,
    wherein the vehicle speed calculating portion corrects the target vehicle speed in accordance with a following state with respect to the movement target position of the vehicle,
    the position calculating portion corrects the movement target position based on the corrected target vehicle speed, and
    the controller controls the vehicle running state such that the vehicle is moved to the corrected movement target position at the corrected target vehicle speed.

2. The parking assist apparatus according to claim 1, wherein in a case where the controller determines that running of following the movement target position is not possible based on the current position of the vehicle and the movement target position, if a running operation of the vehicle is detected, the controller stops a control of the vehicle running state, and if the running operation is not detected, the controller continues the control of the vehicle running state in accordance with the target vehicle speed which is corrected in accordance with a following state with respect to the movement target position of the vehicle.

3. The parking assist apparatus according to claim 2, wherein in a case where a divergence between the current position of the vehicle and the movement target position is a predetermined first divergence value or more, in a case where driving force of the vehicle reaches a first driving force value which is allowed in parking assist, and in a case where braking force is not generated in the vehicle, the controller determines that the vehicle is not capable of running of following the movement target position.

4. The parking assist apparatus according to claim 3, wherein in a case where the controller determines that the following running is not possible, if at least one of a case where the divergence becomes a second divergence value which is smaller as a predetermined amount than the first divergence value, a case where the driving force of the vehicle becomes a second driving force value which is lower as a predetermined amount than the first driving force value, and a case where the braking force of the vehicle becomes a predetermined braking force value or more is satisfied, the controller determines that the following running is possible.

5. The parking assist apparatus according to claim 2, wherein in a case where the controller determines that the following running is not possible, if the controller continues the control of the vehicle running state in accordance with the target vehicle speed which is corrected in accordance with the following state with respect to the movement target position of the vehicle, the controller makes the current vehicle speed of the vehicle into the corrected target vehicle speed.

6. The parking assist apparatus according to claim 4, wherein in a case where the controller causes the control of the vehicle running state to return if the running operation is not detected, the controller makes the current position of the vehicle into the movement target position at the time of control returning.

7. The parking assist apparatus according to claim 2, wherein in a case where the controller stops the control of the vehicle running state by determining that the following running is not possible, if the vehicle reaches a predetermined deceleration start position with respect to the parking target position, the controller restarts the control of the vehicle running state based on the target vehicle speed.

8. The parking assist apparatus according to claim 1, wherein the movement target position is calculated by integrating the target vehicle speed.

* * * * *